W. T. Barnes,
Centrifugal Pump,
Nº 6,191.  Patented Mar. 20, 1849.
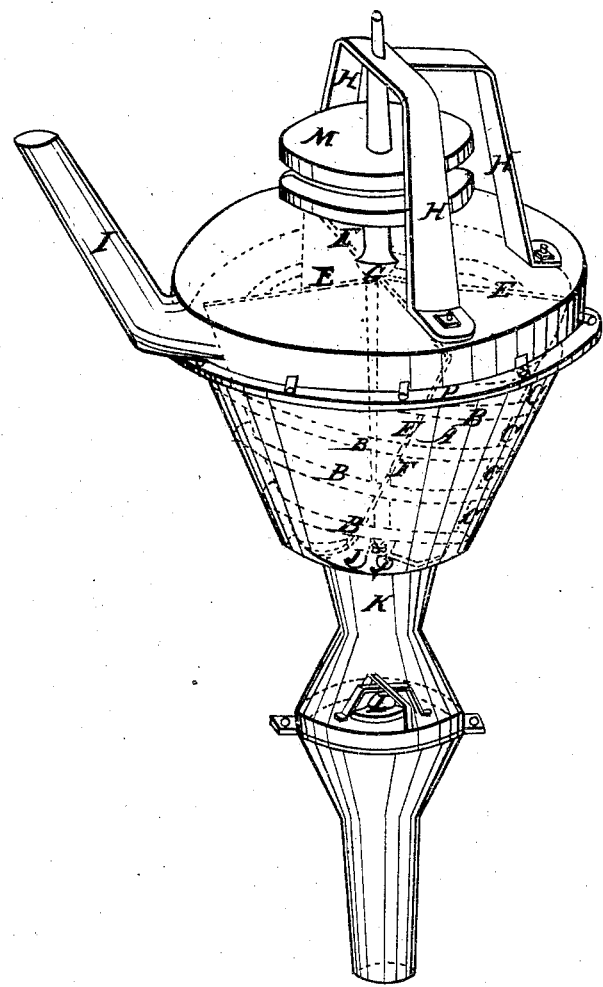

UNITED STATES PATENT OFFICE.

WILLIAM T. BARNES, OF BUFFALO, NEW YORK.

APPARATUS FOR RAISING WATER.

Specification forming part of Letters Patent No. 6,191, dated March 20, 1849; Reissued May 24, 1859, No. 728.

*To all whom it may concern:*

Be it known that I, WILLIAM T. BARNES, of the city of Buffalo, in the county of Erie and State of New York, have invented a new and useful Machine for Raising Water, which I term a Centrifugal Water Spout, and do hereby declare that the following is a full, clear, and exact description of the construction and operation of the same, reference being had to the annexed drawings, making a part of this specification, in which the drawing annexed is a perspective view of the machine.

The case as represented by the letter (A) is an inverted cone forming on the inside a circular inclined plane as shown at (C) the dotted lines (B) is an inward projection in form of a screw inside of the case (N) is a shaft running through the center of the inverted cone to the boxing (D) in which it runs the dotted lines (E) represents fans fastened to the shaft with a backward inclination from the bottom in form of a screw and shaped to run close to the screw projection the dotted lines (G) is an upward projection of the cover of the inverted cone to secure the packing and prevent the escape of water around the shaft or admission of air. (H) is the braces by which the top of the shaft is supported. (I) is a spout or tube through which the water is forced. (J) is the openings in the bottom of the inverted cone through which the water is raised or elevated from the pipe marked (K) attached to the bottom in which is a valve shown at (L). (M) is a band wheel (in common use) attached to the shaft.

To enable others skilled in the art to make and use my invention I will proceed to describe its construction and operation.

It may be made of wood and iron or of either of any size in proportion to the quantity of water to be raised and placed in a frame or otherwise to keep it steady when in operation. I construct the case or hollow cone with or without the screw projection and separate from the cover with or without a groove in the edge of the cover or the outward projection of the cone (which is marked in the annexed drawings (P) in which to place the usual packing and with or without a corresponding convex projection on the cover or projection of the cone, I make my shaft and fans separate and fasten them together by the usual fastenings, bolts, &c., or make them solid if necessary. I make the fans to slant back in a corresponding angle with the inclination of the inverted cone aforesaid and to fit on all sides as near as possible without rubbing I then place the shaft and fans in the inverted hollow cone and place the lower end of the shaft in a boxing of the usual form in the bottom of the inverted cone and then place the cover on the case—the upper end of the shaft passing through it. The packing I place in the groove and bolt the cover to the projection of the cone. The corresponding convex projection or flat surface presses the packing and prevents the water from escaping or the air from entering. I make the pipe attach to the bottom of the cone with an enlargement and joint—the enlargement is to allow the valve to work freely without diminishing the size of the passage of the tube and the joint to take the pipe apart to repair the valve if it should need it and made tight by bolting and packing. The machine may be used in or out of the water. When used in the water no pipe is used at the bottom, but when used out of the water a pipe or tube with a valve in it is attached to the bottom in a manner similar to the way the cover is fastened. Where a very large machine is required there may be a groove made in the bottom of the cone, and a corresponding groove in the shaft in a circle or ring formed for that purpose and attached to fans to place round hard balls in to lessen the friction and sustain the weight of the shaft and fans. The pipe or tube through which the water is forced is attached to the cone or cover so that the water is forced in a tangent from the circle of the cone with a gradual upward turn. The machine may be worked by any of the known powers, and when in operation and placed above the water acts by force and suction the fans being inclined backward as they pass around force the water out of the upper pipe and form a constant vacuum over the pipe below, and the water rushes in, and when placed in the water the cone fills from the holes in the bottom. The water is forced out at the spout or tube by centrifugal force created and increased by the combination of inclined planes and screw form of the fans attached to the shaft.

What I claim and desire to secure by Letters Patent is—

5   Raising water by centrifugal force produced by a combination of inclined planes and fans attached to a shaft as herein described, using any combination of inclined planes or fans to produce the intended effect.

WILLIAM T. BARNES.

Witnesses:
   J. J. JOYCE,
   JAS. G. DAVIS.

[FIRST PRINTED 1913.]